(No Model.)
G. A. LOWRY & M. CRAWFORD.
APPARATUS FOR CATCHING AND SUSPENDING HOGS.
No. 245,643. Patented Aug. 16, 1881.
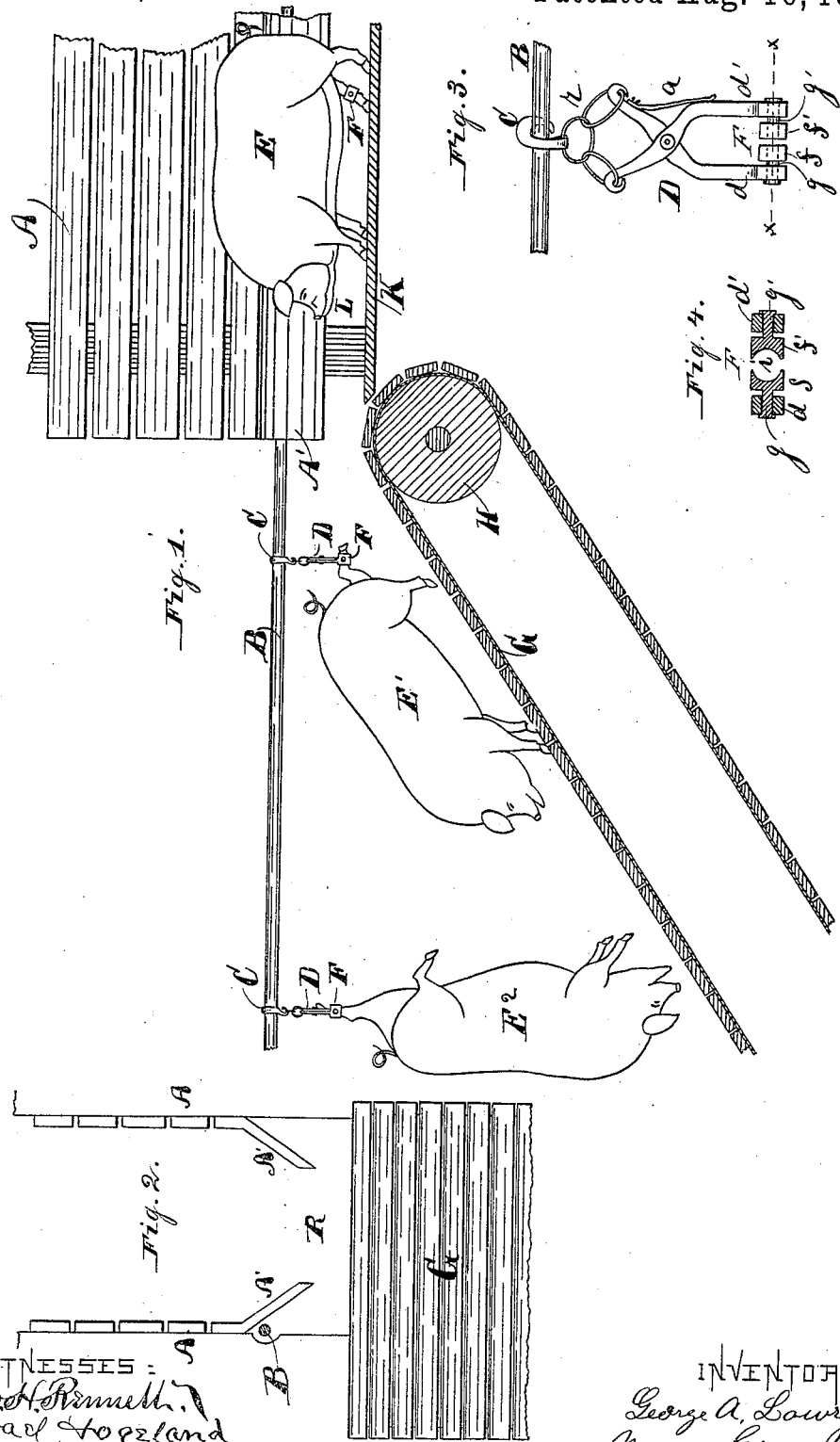
WITNESSES:
Scott H. Bennett
Israel Hogeland
INVENTOR'S.
George A. Lowry
Moses Crawford
Per E. D. Frink their atty

UNITED STATES PATENT OFFICE.

GEORGE A. LOWRY AND MOSES CRAWFORD, OF INDIANAPOLIS, INDIANA.

APPARATUS FOR CATCHING AND SUSPENDING HOGS.

SPECIFICATION forming part of Letters Patent No. 245,643, dated August 16, 1881.

Application filed May 24, 1881. (No model.)

*To all whom it may concern:*

Be it known that we, GEORGE A. LOWRY and MOSES CRAWFORD, both citizens of the United States, residing at Indianapolis, in the county of Marion and State of Indiana, have invented a new and useful apparatus for catching hogs in a hog-chute and conveying them suspended head down to the place for killing, of which the following is a specification.

Our invention relates to an improved device for catching, suspending, and conveying hogs to the place where they are killed, in which a chute having at or near its end a downward-moving platform operates in conjunction with a rod and a pair of peculiarly-constructed tongs attached to a hog's hind leg; and the objects of our invention are, first, to provide a trough for the hog to move forward in, which will permit an operator to attach a pair of adjustable tongs readily firmly to one of the hind legs of a hog; second, to afford facilities for preventing the hog from seeing the operator during the act of attaching the tongs to his leg; third, to provide a movable platform which will move downward or downward and forward as the weight of the hog comes on it; fourth, to provide the tongs with automatically-adjustable clamping-plates, which will fit snugly the hog's leg, and turn as the hog leaves a horizontal and assumes a perpendicular position without injury to the leg. These objects we accomplish by the mechanism illustrated in the accompanying drawings, in which—

Figure 1 represents a longitudinal vertical section of the entire device. Fig. 2 is an end elevation of the same. Fig. 3 is a section of the conveyer-rod with a pair of tongs attached; and Fig. 4 is a section of the tongs, taken on the line x x.

Similar letters refer to like parts throughout the several views.

A represents the sides of a hog-chute leading from a hog-pen to the movable platform or floor G. The lower edges, A' A', of the chute A are inclined inward, so as to keep the hog traveling as near the center of the chute as possible, and to close up the space below, so as to prevent the hog from seeing the operator while he is placing the tongs on its legs.

K represents the floor of the chute, and G represents a movable floor, which moves around the wheel H above and a corresponding wheel or roller below. (Not shown.)

B is the conveyer-rod, arranged at one side of the chute, and extending from said chute to the place for killing, also to the scalding-tub. (Not shown.)

The levers of the tongs D are of the ordinary pattern, suspended on the links r and hook C.

F in Fig. 1 represents in a general manner the adjustable clamping device shown in detail in Figs. 3 and 4, and is constructed as follows, to wit:

$d$ $d'$ represent the lower extremities of the levers of the tongs. The parts $d$ and $d'$ are provided with holes, in which fit the shank $g$ $g'$ of the adjustable clamp $f f'$, and the inner surfaces of said clamps are curved to fit on both sides of a hog's leg. Thus the adjustable clamping-plates $f f'$ are free to turn in the holes in the ends of the tongs and adapt themselves to any position which the hog may assume from the time he is caught until stuck, bled, and slid into the scalding-tub.

The operation of our improved apparatus is as follows: The hog E is driven up the chute A on the floor K. Just before he reaches the movable floor G the clamping-plates $f f'$ of the tongs are placed on his hind leg by an operator at the side of the chute through the space L. The spring $a$ holds the clamp from being pushed off. The hook C is then placed over the bar B, and as the hog advances onto the movable floor or platform G his weight causes the upper side of the platform to move downward. Thus his head is carried downward, while the hook C and tongs D hold his hind-quarters up, as shown at E', Fig. 1. As the platform G continues to move downward the hog gradually assumes a perpendicular position, as shown at $E^2$, and is finally wholly suspended on the carrier-bar B. The hog is then slid along the bar B to the place where he is stuck, and is then moved along over the blood-tub to bleed, thence to the slide, and then into the scalding-tub.

It is obvious that the movable platform G may extend back and form a portion of the floor K, to carry the hog along in the chute, or be constructed in various forms, and that the hog, after having the tongs placed on his leg, can be gradually dropped by a platform sinking directly downward, or by gradually inclining a portion of the floor K as the weight of the hog comes thereon, without departing from the essence of our invention, the object being to let the head of the hog gradually down until the hog assumes a perpendicular position, while the hind-quarters remain suspended to the rod B.

What we claim as new, and desire to secure by Letters Patent, is—

1. The chute A, provided with space L and floor K, combined with the rod B, tongs D, and movable platform G, substantially as specified.

2. In a hog suspending and conveying apparatus, the tongs D, the bar B, the floor K, and movable floor G, substantially as described.

In testimony whereof we have signed our names to this specification in the presence of two subscribing witnesses.

GEO. A. LOWRY.
MOSES CRAWFORD.

Witnesses:
GEORGE H. RENNETT,
E. O. FRINK.